US011832048B2

(12) United States Patent
Jo et al.

(10) Patent No.: US 11,832,048 B2
(45) Date of Patent: Nov. 28, 2023

(54) ELECTRONIC DEVICE INCLUDING SPEAKER MODULE

(71) Applicant: SAMSUNG ELECTRONICS CO., LTD., Suwon-si (KR)

(72) Inventors: Nammin Jo, Suwon-si (KR); Sungkwang Yang, Suwon-si (KR); Junwhon Uhm, Suwon-si (KR); Juyoung Yu, Suwon-si (KR); Heonjun Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 76 days.

(21) Appl. No.: 17/514,948

(22) Filed: Oct. 29, 2021

(65) Prior Publication Data
US 2022/0210537 A1  Jun. 30, 2022

Related U.S. Application Data

(63) Continuation of application No. PCT/KR2021/014093, filed on Oct. 13, 2021.

(30) Foreign Application Priority Data

Dec. 31, 2020  (KR) .................. 10-2020-0188809

(51) Int. Cl.
H04R 1/10 (2006.01)
H04R 1/02 (2006.01)
(Continued)

(52) U.S. Cl.
CPC ........... *H04R 1/1075* (2013.01); *H04R 1/025* (2013.01); *H04R 1/105* (2013.01); *H04R 1/1008* (2013.01);
(Continued)

(58) Field of Classification Search
CPC .... H04R 1/1075; H04R 1/025; H04R 1/1008; H04R 1/105; H04R 1/34; H04R 2201/107;
(Continued)

(56) References Cited

U.S. PATENT DOCUMENTS 6,349,001 B1   2/2002  Spitzer
7,492,602 B2 *  2/2009  Kim ...................... G06F 1/1626
                                                                          361/752
(Continued)

FOREIGN PATENT DOCUMENTS

KR  10-2013-0097590 A   9/2013
KR  1020190038264 A   4/2019
(Continued)

OTHER PUBLICATIONS

International Search Report (PCT/ISA/210) and Written Opinion (PCT/ISA/237) dated Jan. 25, 2022 issued by the International Searching Authority in International Application No. PCT/KR2021/014093.

*Primary Examiner* — Oyesola C Ojo
(74) *Attorney, Agent, or Firm* — Sughrue Mion, PLLC

(57) ABSTRACT

An electronic device may include: a housing; a speaker provided inside the housing; an interposer board provided inside the housing, the interposer board including a first board, a second board spaced apart from the first board, and a side wall surrounding an internal space between the first board and the second board; and a sealing member provided between the speaker and the first board, wherein the first board may include at least one first through hole configured to transmit at least a portion of sound generated by the speaker to the internal space.

15 Claims, 10 Drawing Sheets

(51) Int. Cl.
*H04R 1/34* (2006.01)
*G02C 11/00* (2006.01)

(52) U.S. Cl.
CPC .............. *H04R 1/34* (2013.01); *G02C 11/10* (2013.01); *H04R 2201/107* (2013.01)

(58) Field of Classification Search
CPC .. H04R 1/2811; H04R 2499/15; H04R 1/028; G02C 11/10; G02C 11/06
See application file for complete search history.

(56) References Cited

U.S. PATENT DOCUMENTS

| | | | |
|---|---|---|---|
| 8,885,867 B1* | 11/2014 | Tai | H04R 1/345 |
| | | | 381/388 |
| 10,178,457 B1 | 1/2019 | Tao et al. | |
| 2005/0233781 A1* | 10/2005 | Erixon | H01Q 1/243 |
| | | | 455/575.1 |
| 2007/0154053 A1* | 7/2007 | Yang | H04M 1/035 |
| | | | 381/386 |
| 2010/0061578 A1* | 3/2010 | Zhou | H04R 1/06 |
| | | | 381/345 |
| 2013/0223655 A1* | 8/2013 | Lee | H04R 1/34 |
| | | | 381/189 |
| 2014/0029783 A1* | 1/2014 | Yang | H04R 1/02 |
| | | | 381/395 |
| 2016/0112781 A1* | 4/2016 | Lee | H04R 1/2803 |
| | | | 381/332 |
| 2018/0084323 A1* | 3/2018 | Luce | H04R 9/025 |
| 2019/0082536 A1* | 3/2019 | Park | H04M 1/0262 |
| 2019/0104212 A1 | 4/2019 | Lee et al. | |
| 2019/0313529 A1 | 10/2019 | Kim et al. | |
| 2020/0186180 A1 | 6/2020 | Park et al. | |
| 2020/0292850 A1 | 9/2020 | Takeda et al. | |
| 2021/0072801 A1* | 3/2021 | Leopold | H02J 7/0042 |

FOREIGN PATENT DOCUMENTS

| | | |
|---|---|---|
| KR | 1020190125461 A | 11/2019 |
| KR | 1020200027569 A | 3/2020 |
| KR | 1020200069167 A | 6/2020 |

\* cited by examiner

ELECTRONIC DEVICE INCLUDING SPEAKER MODULE

CROSS-REFERENCE TO RELATED APPLICATIONS

This application is a continuation of International Application No. PCT/KR2021/014093 designating the United States, filed on Oct. 13, 2021, in the Korean Intellectual Property Receiving Office and claiming priority to Korean Patent Application No. 10-2020-0188809, filed on Dec. 31, 2020 in the Korean Intellectual Property Office, the disclosures of which are incorporated by reference herein in their entireties.

BACKGROUND

Field

Various embodiments of the disclosure relate to an electronic device including a speaker module.

Description of Related Art

With the development of electronic and communication technologies, electronic devices can be reduced in size and weight to such an extent that the electronic devices can be used with ease even when the electronic devices are worn on a user's body. For example, wearable electronic devices, such as a head mount device (HMD), a smart watch (or band), a contact lens-type device, a ring-type device, a glove-type device, a shoe-type device, or a clothing-type device, are commercially available. Since the wearable electronic devices are directly worn on a user's body, portability and user accessibility may be improved.

A head mount device is a device, which operates while the device is being worn on a user's head or face and may provide augmented reality (AR) to the user. For example, a head mount device providing augmented reality may be implemented in the form of glasses, and may provide information about an object in the form of an image or text to the user in at least a partial space of the user's field of view. The head mount device may provide virtual reality (VR) to a user. For example, by outputting independent images to the user's both eyes, respectively, and outputting a content provided from an external input to the user in the form of an image or sound, the head mount device may provide an excellent sensation of immersion.

SUMMARY

Electronic devices are being reduced in size and weight in order to increase users' portability and convenience, and may include components integrated in a small space for high performance.

In an electronic device, the performance of a speaker may be improved using a resonance space in which the sound generated by the speaker can be resonated. For example, an electronic device may provide sound to a user using a speaker module including a resonance space therein or a speaker having one open side. However, in an electronic device including a speaker module including a resonance space therein, the volume thereof may be increased or a mounting space therein may be reduced, and in an electronic device including a speaker module having one open side, sound leakage may occur which may degrade the speaker performance.

According to various embodiments of the disclosure, an electronic device using an internal space of an electronic component as a resonance space of a speaker may be provided.

However, the problems to be solved in the disclosure are not limited to the above-mentioned problems, and may be variously expanded without departing from the spirit and scope of the disclosure.

According to an aspect of the disclosure, an electronic device may include: a housing; a speaker provided inside the housing; an interposer board provided inside the housing, the interposer board including a first board, a second board spaced apart from the first board, and a side wall surrounding an internal space between the first board and the second board; and a sealing member provided between the speaker and the first board, wherein the first board may include at least one first through hole configured to transmit at least a portion of sound generated by the speaker to the internal space.

At least a portion of the speaker may face the at least one first through hole.

The sealing member may be provided between the speaker and a first area of the first board including the at least one first through hole.

The speaker may include a speaker unit and a speaker frame configured to accommodate the speaker unit and facing the first board.

At least a portion of the speaker may face at least a portion of the side wall.

The speaker may include a connection member connecting the speaker to the interposer board and facing the at least one first through hole.

The connection member may include at least one second through hole configured to transmit at least the part of the sound generated by the speaker to the at least one first through hole and the internal space.

The interposer board may include at least one third through hole spaced apart from the at least one first through hole.

The housing may include a lens frame configured to accommodate a display member, and a wearing member extending from the lens frame and configured to accommodate the speaker and the interposer board.

The wearing member may include an inner case having an inner surface configured to face a body of user of the electronic device and an outer case including an outer surface opposite to the inner surface, and the speaker may be provided between the inner case and the interposer board.

The electronic device may further include a battery provided in the wearing member and configured to provide power to the speaker, wherein the speaker is provided between the battery and the interposer board.

The electronic device may further include a light output device provided inside the housing and configured to output an image.

The sealing member may have a closed loop shape.

The speaker may include a speaker unit and a speaker frame including a speaker resonance space configured to accommodate the speaker unit and receive sound generated by the speaker unit, and the sound generated by the speaker unit resonates in the speaker resonance space and the internal space.

The housing may include: a first housing configured to surround at least a portion of a head of a user; a second housing coupled to the first housing and configured to be seated on a face of the user; and a third housing coupled to the first housing and configured to be seated on a rear portion of the head of the user.

According to an aspect of the disclosure, an electronic device may include: a lens frame configured to accommodate a display member; a wearing member extending from the lens frame; a speaker disposed inside the wearing member; a light output device configured to output an image to the display member; an interposer board including a first board, a second board spaced apart from the first board, and a side wall surrounding at least a part of an internal space located between the first board and the second board; and a sealing member connected to the speaker and the first board, wherein the first board may include at least one first through hole configured to transmit at least a portion of sound generated by the speaker to the internal space.

In the electronic device according to various embodiments of the disclosure, speaker performance can be improved using the internal space of the interposer board as a resonance space.

DETAILED DESCRIPTION

Figure 1:
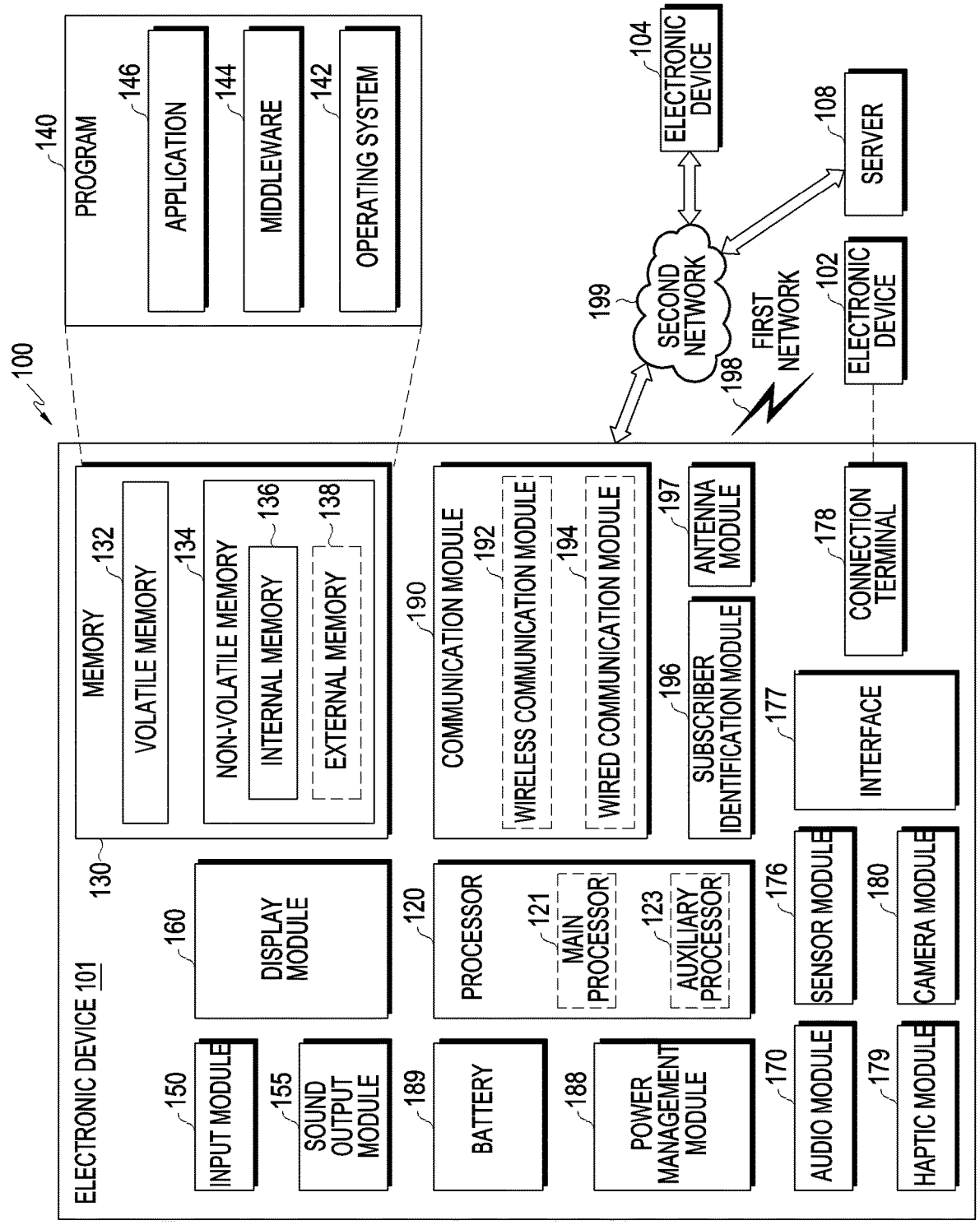
FIG. 1 is a block diagram of an electronic device according to various embodiments of the disclosure in a network environment.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an electronic device in a network environment according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 such as a speaker or a headphone) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to one or more components of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multiple components (e.g., multiple chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2:
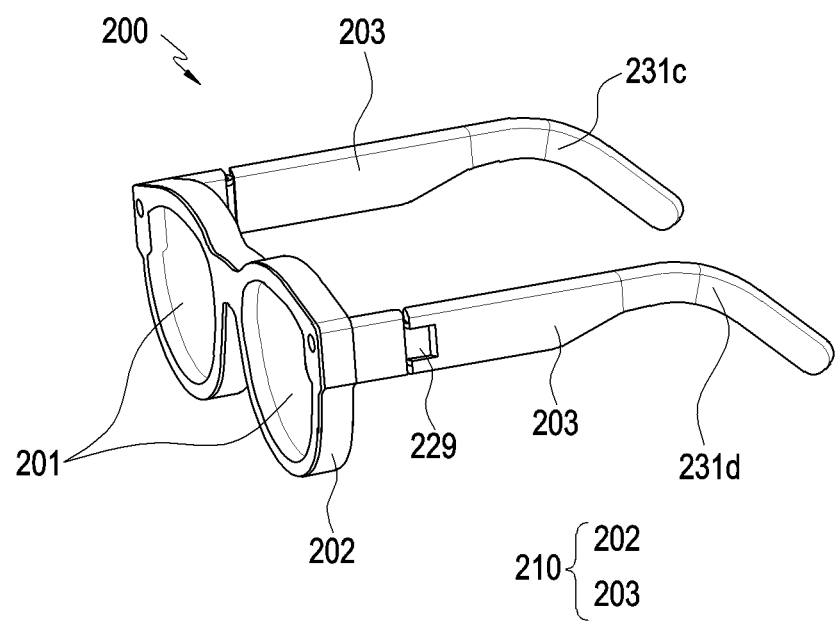
FIG. 2 is a perspective view illustrating an electronic device according to various embodiments of the disclosure.

FIG. 2 is a perspective view illustrating an electronic device according to an embodiment of the disclosure.

Referring to FIG. 2, the electronic device 200 is a wearable electronic device in the form of glasses, and a user may visually recognize a surrounding object or environment in the state of wearing the electronic device 200. For example, the electronic device 200 may be a head mount device (HMD) or smart glasses capable of providing an image directly in front of the user's eyes. The configuration of the electronic device 200 of FIG. 2 may be same as that of the electronic device 101 of FIG. 1 or may be partly same as that of the electronic device 101 of FIG. 1. For instance, the electronic device 200 of FIG. 2 may include all of the components in electronic device 101 of FIG. 1 or may include only some of components in the electronic device 101 of FIG. 1.

According to various embodiments, the electronic device 200 may include a housing 210 that defines an exterior of the electronic device 200. The housing 210 may provide a space in which components of the electronic device 200 may be disposed. For example, the housing 210 may include a lens frame 202 and at least one wearing member 203.

According to various embodiments, the electronic device 200 may include at least one display member 201 capable of providing visual information to the user. For example, the display member 201 may include a module equipped with a lens, a display, a waveguide, and/or a touch panel. Moreover, the display member 201 may include a circuit configured to implement a touch interface. According to an embodiment, the display member 201 may be transparent or translucent. According to an embodiment, the display member 201 may include a translucent glass or a window member capable of adjusting the transmittance of light by adjusting the color concentration thereof. According to an embodiment, a pair of display members 201 may be provided and may be disposed to correspond to the left eye and the right eye of the user, respectively, in the state in which the electronic device 200 is worn on the user's body.

According to various embodiments, the lens frame 202 may accommodate at least a part of the display members 201. For example, the lens frame 202 may surround at least a part of the edges of the display members 201. According to an embodiment, the lens frame 202 may position at least one of the display members 201 to correspond to the user's eyes. According to an embodiment, the lens frame 202 may be a rim having a general eyeglass structure. According to an embodiment, the lens frame 202 may include at least one closed loop surrounding the display members 201.

According to various embodiments, the wearing member 203 (e.g., temples of the glasses) may extend from the lens frame 202. For example, the wearing member 203 may extend from respective ends of the lens frame 202 and may be supported or located on the user's body (e.g., ears) together with the lens frame 202. According to an embodiment, the wearing member 203 may be hingedly coupled to the lens frame 202 through a hinge structure 229. According to an embodiment, the wearing member 203 may include inner surfaces 231c configured to face the user's body and outer surfaces 231d opposite to the inner surfaces.

According to various embodiments, the electronic device 200 may include the hinge structure 229 configured to enable the wearing member 203 to be folded with respect to the lens frame 202. The hinge structure 229 may be disposed between the lens frame 202 and the wearing member 203. In the state in which the electronic device 200 is not worn, the user may carry or store the electronic device 200 in the state in which the wearing member 203 is folded to partially overlap the lens frame 202.

Figure 3:
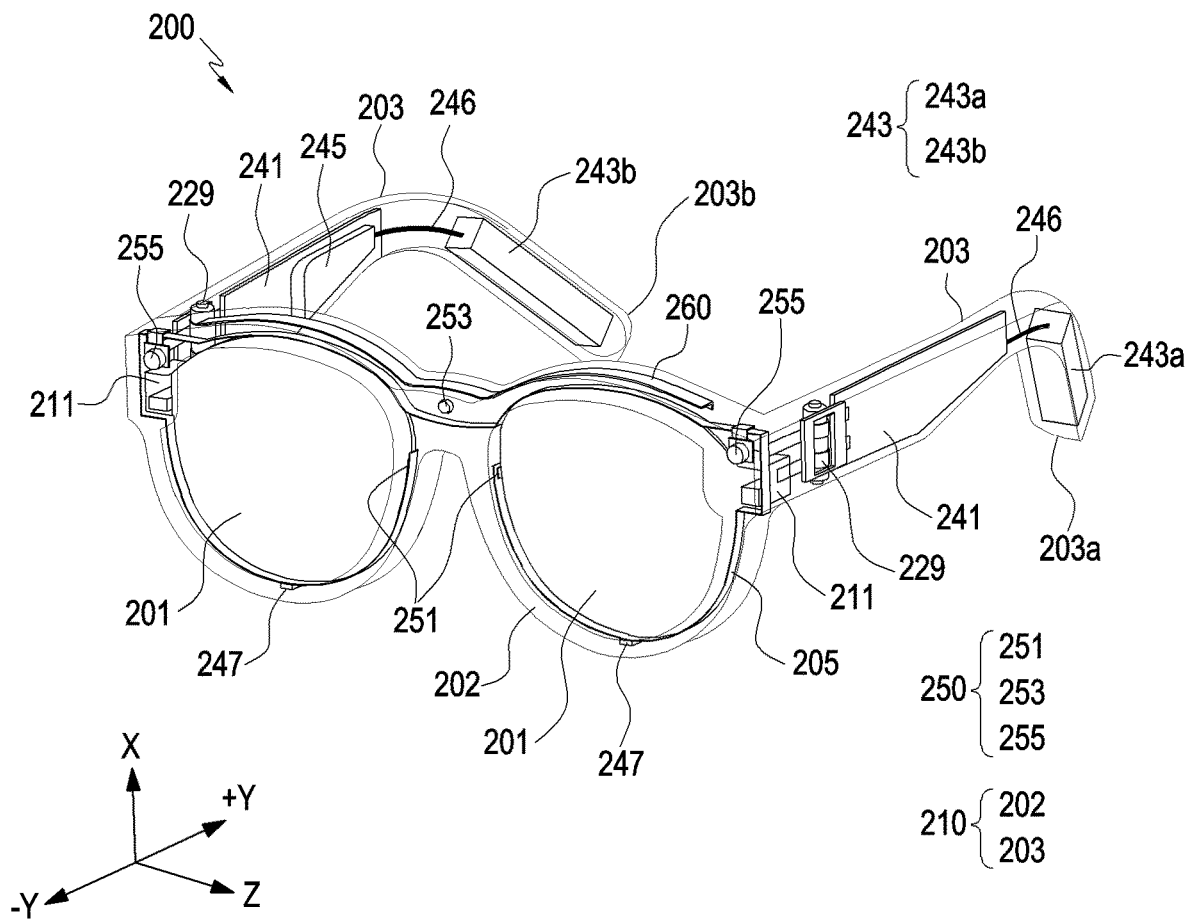
FIG. 3 is a perspective view for describing an internal configuration of an electronic device according to an embodiment of the disclosure.
Figure 4:
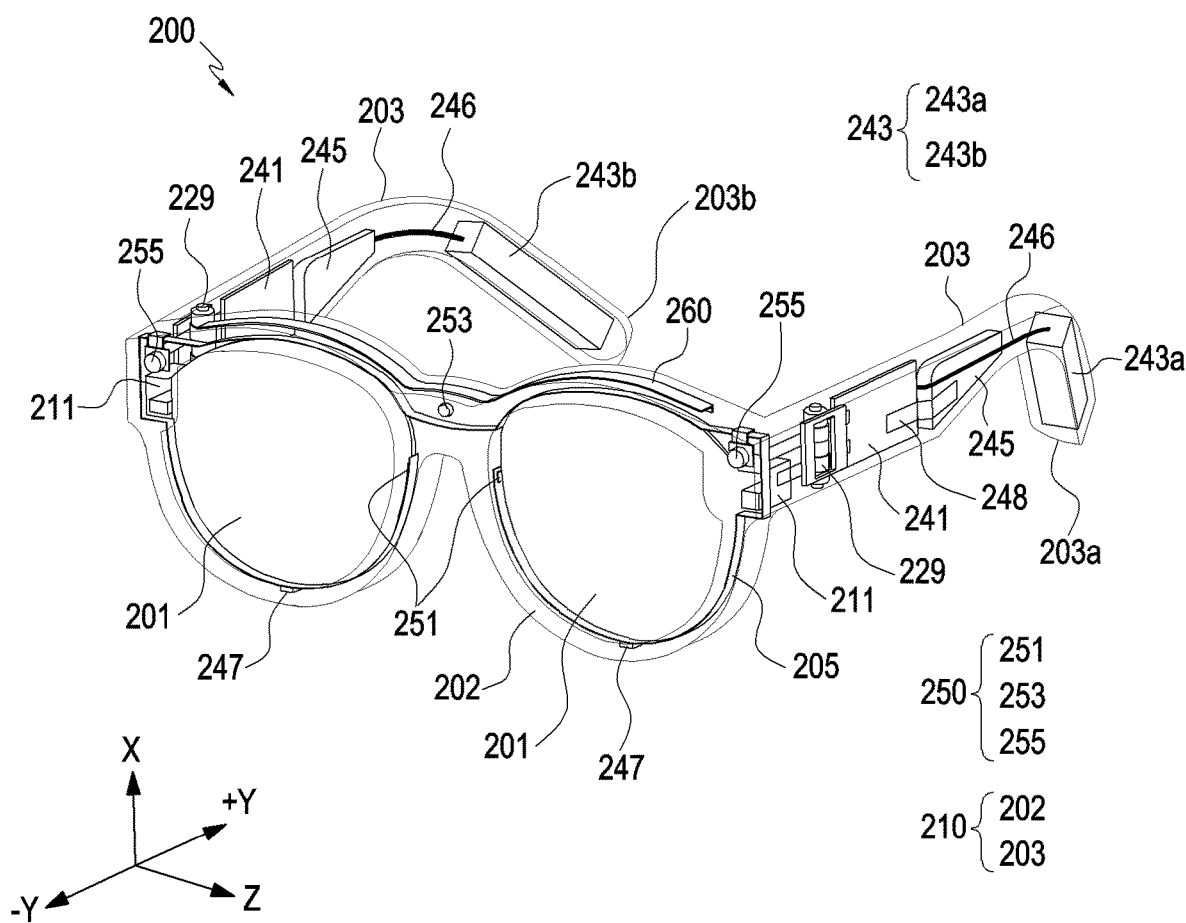
FIG. 4 is a perspective view for describing an internal configuration of an electronic device according to various embodiments of the disclosure.
Figure 5:
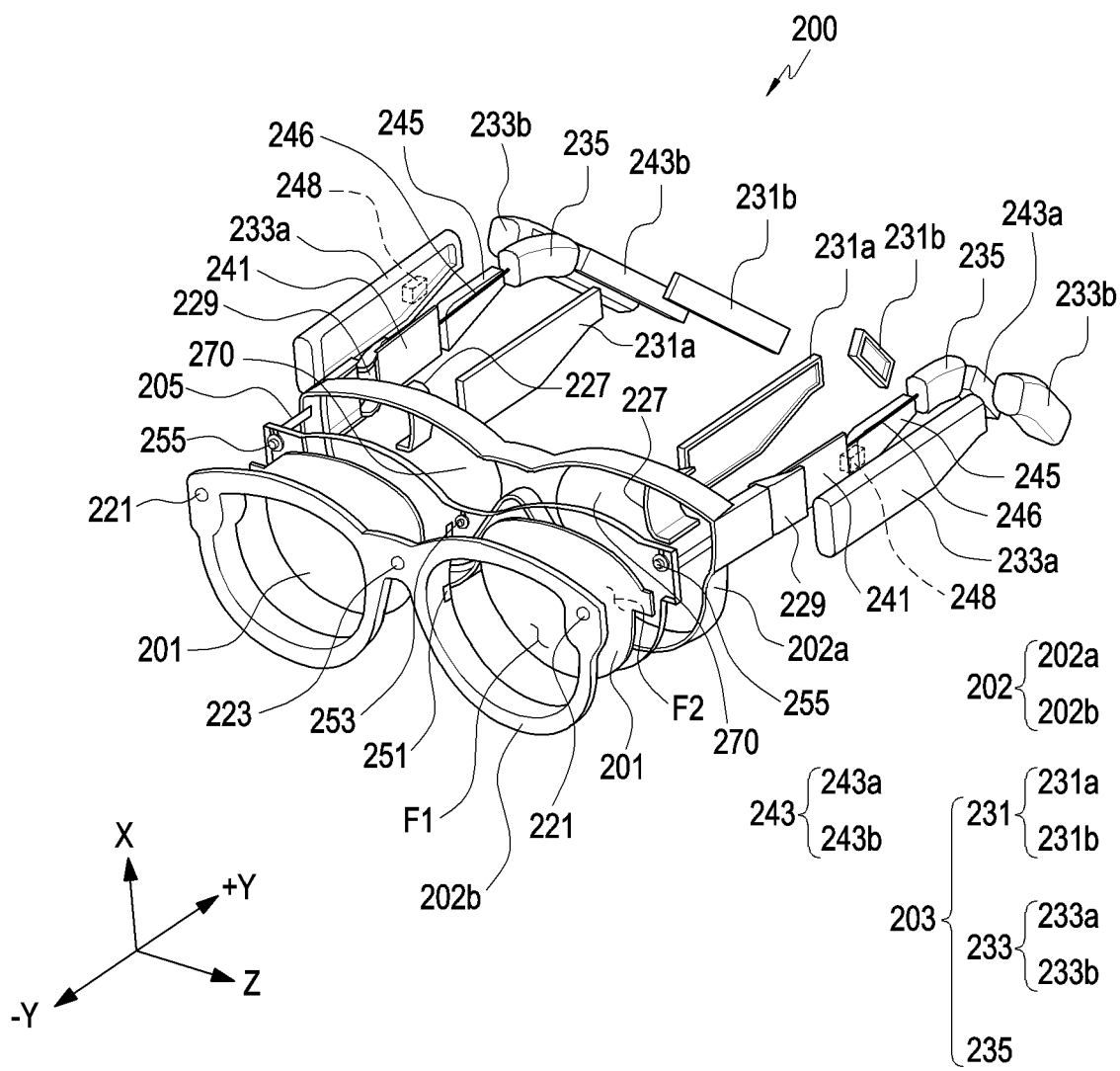
FIG. 5 is an exploded perspective view illustrating the electronic device according to various embodiments of the disclosure.

FIG. 3 is a perspective view for describing an internal configuration of an electronic device according to an embodiment of the disclosure. FIG. 4 is a perspective view for describing an internal configuration of an electronic device according to another embodiment of the disclosure. FIG. 5 is an exploded perspective view illustrating an electronic device according to various embodiments of the disclosure.

Referring to FIGS. 3, 4, 5, the electronic device 200 may include components accommodated in the housing 210. According to an embodiment, the components may include at least one circuit board 241, at least one battery 243, at least one speaker module or speaker 245, at least one power transmission structure 246, and a camera module 250. According to an embodiment, the at least one circuit board 241 may include a printed circuit board (PCB), a printed board assembly (PBA), a flexible PCB (FPCB), or a rigid-flex PCB (RFPCB). The configuration of the housing 210 of FIGS. 3 and 4 may be same as the configuration of the housing 210 of FIG. 2. However, according to another embodiment, the configuration of the housing 210 of FIGS. 3 and 4 may be partly same as the configuration of the housing 210 of FIG. 2.

According to various embodiments, the electronic device 200 may acquire and/or recognize visual images regarding an object or environment in a direction, in which the user gazes or the electronic device 200 is oriented (e.g., −Y direction), using a camera module 250 (e.g., the camera module 180 of FIG. 1) and may receive information about an object or environment from an external electronic device (e.g., the electronic devices 102 and 104 or the server 108 in FIG. 1) via a network (e.g., the first network 198 or the second network 199 in FIG. 1). In another embodiment, the electronic device 200 may provide the provided information about the object or environment to the user in an acoustic or visual form. The electronic device 200 may provide the received information about the object or environment to the user through the display member 201 in a visual form using a display module (e.g., the display module 160 in FIG. 1). For example, the electronic device 200 may implement augmented reality by implementing the information about an object or environment in a visual form and combining the information with an actual image of the environment around the user.

According to various embodiments of the disclosure, the display member 201 may include a first surface F1 oriented in a direction (e.g., in the −Y direction) in which external light is incident and a second surface F2 facing away from the first surface F1 (e.g., in the +Y direction). In the state in which the user wears the electronic device 200, at least a part of the light or image incident through the first surface F1 may pass through the second surface F2 of the display members 201, which is disposed to face the user's left eye and/or right eye to be incident to the user's left eye and/or right eye.

According to various embodiments, the lens frame 202 may include at least two frames. For example, the lens frame 202 may include a first frame 202a and a second frame 202b. According to an embodiment, when the user wears the electronic device 200, the first frame 202a may be a frame of a portion facing the user's face, and the second frame 202b may be a part of the lens frame 202 spaced apart from the first frame 202a in the user's gazing direction (e.g., −Y direction).

According to various embodiments, a light output module (or light output device) 211 may provide an image and/or a video to the user. For example, the light output module 211 may include a display panel capable of outputting an image, and a lens corresponding to the user's eyes and is configured to guide the image to the corresponding display member 201. For example, the user may acquire an image output from the display panel of the light output module 211 through the lens of the light output module 211. According to various embodiments, each light output module 211 may include a device configured to display various pieces of information. For example, the light output module 211 may include at least one of a liquid crystal display (LCD), a digital mirror device (DMD), a liquid crystal-on-silicon (LCoS) device, or an organic light emitting diode, or an organic light-emitting diode (OLED), or a micro light emitting diode (a micro-LED). According to an embodiment, when the light output module 211 and/or the display member 201 include one of a liquid crystal display device, a digital mirror display device, or a silicon liquid crystal display device, the electronic device 200 may include a light source that emits light to a display area of the light output module 211 and/or the display member 201. According to another embodiment, when the light output module 211 and/or the display member 201 include one of an organic light emitting diode or a micro-LED, the electronic device 200 may provide a virtual image to the user without including a separate light source.

According to various embodiments, at least a part of the light output module 211 may be disposed in the housing 210. For example, the light output modules 211 may be disposed on the wearing member 203 or the lens frame 202 to correspond to the user's right eye and left eye, respectively. According to an embodiment, the light output module 211 may be connected to the display member 201 and may provide an image to the user through the display member 201. For example, an image output from the light output module 211 is incident on the display member 201 via an input optical member located at one end of the display member 201, and may be emitted to the user's eyes through a waveguide and an output optical member located in at least a part of the display member 201. According to an embodiment, the waveguide may be made of glass, plastic, or polymer, and may include a nano-pattern formed on one inner or outer surface, for example, a grating structure of a polygonal or curved shape. According to an embodiment, the waveguide may include at least one of at least one diffractive element (e.g., a diffractive optical element (DOE) or a holographic optical element (HOE)) or a reflective element (e.g., a reflective mirror).

According to various embodiments, the circuit board 241 may include components for driving the electronic device 200. For example, the circuit board 241 may include at least one integrated circuit chip, and at least one of the processor 120, the memory 130, the power management module 188, or the communication module 190 of FIG. 1 may be provided in the integrated circuit chip. According to an embodiment, the circuit board 241 may be disposed inside each wearing member 203 of the housing 210. According to an embodiment, the circuit board 241 may be electrically connected to the battery 243 via a power transmission structure 246. According to an embodiment, the circuit board 241 may be connected to a flexible printed circuit board 205 and may transmit electric signals to electronic components (e.g., the light output modules 211, the camera module 250, and a light emitter) of the electronic device via the flexible printed circuit board 205. According to an embodiment, the circuit board 241 may be an interposer board.

According to various embodiments, the flexible printed circuit board 205 may extend from the circuit board 241 across a hinge structure 229 into the inside of the lens frame 202 and may be disposed in at least a part around the display member 201 in the inside of the lens frame 202.

According to various embodiments, the battery 243 (e.g., the battery 189 in FIG. 1) may be electrically connected to the components (e.g., the light output module 211, the circuit board 241, the speaker module 245, the microphone module 247, and/or the camera module 250) of the electronic device 200, and may supply power to the components of the electronic device 200.

According to various embodiments, at least a part of the battery 243 may be disposed on the wearing member 203. According to an embodiment, the battery 243 may be disposed adjacent to the end 203a or 203b of the wearing member 203. For example, the battery 243 may include a first battery 243a disposed at the first end 203a of the wearing member 203 and a second battery 243b disposed at the second end 203b of the wearing member 203.

According to various embodiments, the speaker module or speaker 245 (e.g., the audio module 170 or the sound output module 155 in FIG. 1) may convert an electrical signal into sound. At least a part of the speaker module 245 may be disposed inside the wearing member 203 of the housing 210. According to an embodiment, the speaker module 245 may be located inside the wearing member 203 to correspond to a user's ear. According to an embodiment as illustrated in FIG. 3, the speaker module 245 may be disposed on the circuit board 241. For example, the speaker module 245 may be disposed between the circuit board 241 and inner case (e.g., the inner case 231 in FIG. 5). According to an embodiment (e.g., FIG. 4), the speaker module 245 may be disposed next to the circuit board 241. For example, the speaker module 245 may be disposed between the circuit board 241 and the battery 243.

According to various embodiments, the electronic device 200 may include a connection member 248 that connects the speaker module 245 to the circuit board 241. The connection members 248 may transmit at least a part of the sound and/or vibration generated by the speaker module 245 to the circuit board 241. According to an embodiment, the connection member 248 may be integrally formed with the speaker module 245. For example, a portion extending from a speaker frame (e.g., the speaker frame 314 in FIG. 6) of the speaker module 245 may be interpreted as a connection member 248. The configuration of the connection member 248 will be further described with reference to FIG. 10. According to an embodiment (e.g., FIG. 3), the connection member 248 may be omitted. For example, when the speaker module 245 is disposed on the circuit board 241, the connection member 248 may be omitted.

According to various embodiments, the power transmission structure 246 may transmit power from the battery 243 to an electronic component (e.g., the light output module 211) of the electronic device 200. For example, the power transmission structure 246 may be electrically connected to the battery 243 and/or the circuit board 241, and the circuit board 241 may transmit, to the light output module 211, power received through the power transmission structure 246.

According to various embodiments, the power transmission structure 246 may be a configuration capable of transmitting power. For example, the power transmission structure 246 may include a flexible printed circuit board or wire. For example, the wire may include a plurality of cables. In various embodiments, the shape of the power transmission structure 246 may be variously modified in consideration of the number and/or type of cables.

According to various embodiments, a microphone module 247 (e.g., the input module 150 and/or the audio module 170 of FIG. 1) may convert sound into an electrical signal. According to an embodiment, a microphone module 247 may be disposed on at least a part of the lens frame 202. For example, at least one microphone module 247 may be disposed at the lower end (e.g., in the direction oriented in the −X axis) and/or at the upper end (e.g., in the direction oriented in the +X axis) of the electronic device 200. According to various embodiments, the electronic device 200 may more clearly recognize the user's voice using voice information (e.g., sound) acquired from the at least one microphone module 247. For example, on the basis of the acquired voice information and/or additional information (e.g., low-frequency vibration of the user's skin and bone), the electronic device 200 may distinguish voice information and ambient noise from each other. For example, the electronic device 200 may clearly recognize the user's voice and may perform a function of reducing ambient noise (e.g., noise canceling).

According to various embodiments, the camera module 250 may photograph a still image and/or a moving image. The camera module 250 may include at least one of a lens, at least one image sensor, an image signal processor, or a flash. According to an embodiment, the camera module 250 may be disposed in the lens frame 202 and disposed around the display member 201.

According to various embodiments, the camera module 250 may include at least one first camera module 251. According to an embodiment, the first camera module 251 may photograph the trajectory of the user's eyes (e.g., pupils) or gaze. For example, the first camera module 251 may photograph a reflection pattern of light emitted by a light emitter to the user's eyes. For example, the light emitter may emit light in an infrared band for tracking the trajectory of the gaze using the first camera module 251. For example, the light emitter may include an IR LED. According to an embodiment, in order to make a virtual image projected to the display member 201 correspond to the direction at which the user's pupils gaze, the processor (e.g., the processor 120 in FIG. 1) may adjust the position of the virtual image. According to an embodiment, the first camera module 251 may include a global shutter (GS) type camera, and may track the trajectory of the user's eyes or gaze using a plurality of first camera modules 251 having the same standard and performance.

According to various embodiments, the first camera module 251 may periodically or aperiodically transmit information related to the trajectory of the user's eyes or gaze (e.g., trajectory information) to a processor (e.g., the processor 120 in FIG. 1). According to another embodiment, the first camera module 251 may transmit the trajectory information to the processor when detecting that the user's gaze has changed based on the trajectory information (e.g., the eyes move more than a reference value in the state in which the head is not moving).

According to various embodiments, the camera module 250 may include a second camera module 253. According to an embodiment, the second camera module 253 may capture an external image. According to an embodiment, the second camera module 253 may be a global shutter type or a rolling shutter (RS) type camera. According to an embodiment, the second camera module 253 may capture an external image through a second optical hole 223 provided in the second frame 202b. For example, the second camera module 253 may include a high-resolution color camera and may be a high-resolution (HR) or photo-video (PV) camera. In addition, the second camera module 253 may provide an auto focus (AF) function and an optical image stabilizer (OIS) function.

According to various embodiments, the electronic device 200 may include a flash located adjacent to the second camera module 253. For example, the flash may provide light for increasing the brightness (e.g., illuminance) around the electronic device 200 when acquiring an external image of the second camera module 253, and may reduce difficulty of acquiring an image due to a dark environment, mixing of various light sources, and/or reflection of light.

According to various embodiments, the camera module 250 may include at least one third camera module 255. According to an embodiment, the third camera module 255 may photograph a user's motion through the first optical hole 221 provided in the lens frame 202. For example, the third camera module 255 may photograph the user's gesture (e.g., a hand gesture). The third camera module 255 and/or first optical hole 221 may be disposed at each of the opposite ends of the lens frame 202 (e.g., the second frame 202b) (e.g., the opposite ends of the lens frame 202 (e.g., the second frame 202b) in the X direction). According to an embodiment, the third camera module 255 may be a global shutter (GS) type camera. For example, the third camera module 255 may provide 360-degree spatial (e.g., omnidirectional), positional, and/or movement recognition using a camera that supports 3 degrees of freedom (DoF) or 6DoF. According to an embodiment, the third camera module 255 may perform a movement path tracking function (simultaneous localization and mapping (SLAM)) and a user movement recognition function using a plurality of global shutter-type cameras of the same standard and performance as stereo cameras. According to an embodiment, the third camera module 255 may include an infrared (IR) camera (e.g., a time of flight (ToF) camera or a structured light camera). For example, the IR camera may be operated as at least a part of a sensor module (e.g., the sensor module 176 in FIG. 1) for detecting a distance to a subject.

According to an embodiment, at least one of the first camera module 251 and the third camera module 255 may be replaced with a sensor module (e.g., the sensor module 176 in FIG. 1). For example, the sensor module may include at least one of a vertical cavity surface emitting laser (VCSEL), an infrared sensor, and/or a photodiode. For example, the photodiode may include a positive intrinsic negative (PIN) photodiode or an avalanche photodiode (APD). The photodiode may be referred to as a photo detector or a photo sensor.

According to an embodiment, at least one of the first camera module 251, the second camera module 253, and the third camera module 255 may include a plurality of camera modules. For example, the second camera module 253 may include a plurality of lenses (e.g., wide-angle and telephoto lenses) and image sensors and may be disposed on one side (e.g., a surface oriented in the −Y axis) of the electronic device 200. For example, the electronic device 200 may include a plurality of camera modules having different attributes (e.g., angles of view) or functions, respectively, and may control the camera modules to change the angles of view of thereof based on the user's selection and/or trajectory information. For example, at least one of the plurality of camera modules may be a wide-angle camera, and at least one of other camera modules may be a telephoto camera.

According to various embodiments, the processor (e.g., the processor 120 of FIG. 1) may determine the movement of the electronic device 300 and/or the user's movement using the information of the electronic device 200 acquired using at least one of the gesture sensor, the gyro sensor, or the acceleration sensor of the sensor module (e.g., the sensor module 176 in FIG. 1) and the user's movement (e.g., the approach of the user's body to the electronic device 200) acquired using the third camera module 255. According to an embodiment, in addition to the above-described sensors, the electronic device 200 may include a magnetic (geomagnetic) sensor capable of measuring an orientation using a magnetic field and a magnetic field line and/or a Hall sensor capable of acquiring movement information (e.g., a movement direction or a movement distance). For example, the processor may determine the movement of the electronic device 200 and/or the movement of the user based on information acquired from the magnetic (geomagnetic) sensor and/or the Hall sensor.

According to various embodiments, the electronic device 200 may perform an input function (e.g., a touch and/or a pressure detection function) capable of interacting with the user. For example, components configured to perform a touch and/or a pressure detection function (e.g., a touch sensor and/or a pressure sensor) may be disposed on at least a part of the wearing member 203. The electronic device 200 may control the virtual image output through the display member 201 based on the information acquired through the components. For example, the sensors related to a touch and/or a pressure detection function may be configured in various types, such as a resistive type, a capacitive type, an electro-magnetic type (EM), or an optical type. According to an embodiment, the components configured to perform a touch and/or a pressure detection function may be all or partly the same as the configuration of the input module 150 of FIG. 1.

According to various embodiments, the electronic device 200 may include a reinforcing member 260 disposed in the internal space of the lens frame 202 and configured to have a higher rigidity than that of the lens frame 202.

According to various embodiments, the electronic device 200 may include a lens structure 270. The lens structure 270 may refract at least a part of light. For example, the lens structure 270 may be a prescription lens having a specified refractive power. According to an embodiment, the lens structure 270 may be disposed behind (e.g., in the +Y direction) the window member of the display member 201. For example, the lens structure 270 may be positioned between the display member 201 and the user's eyes. For example, the lens structure 270 may face one surface of the display member 201.

According to various embodiments, the housing 210 may include a hinge cover 227 that is capable of concealing a part of the hinge structure 229. According to an embodiment, another part of the hinge structure 229 may be accommodated or concealed between the inner case 231 and the outer case 233 to be described later.

According to various embodiments, the wearing member 203 may include an inner case 231 and an outer case 233. The inner case 231 is, for example, a case configured to face the user's body or come into direct contact with the user's body, and may be made of a material having a low thermal conductivity (e.g., a synthetic resin). According to an embodiment, the inner case 231 may include an inner surface (e.g., the inner surface 231c in FIG. 2) facing the user's body. The outer case 233 may include, for example, a material (e.g., a metal material) capable of at least partially transferring heat, and may be coupled to face the inner case 231. According to an embodiment, the outer case 233 may include an outer surface (e.g., the outer side 231d of FIG. 2) opposite to the inner surface 231c. In an embodiment, at least one of the circuit board 241 or the speaker module 245 may be accommodated in a space separated from the battery 243 within the wearing member 203. According to an embodiment, the inner case 231 may include a first case 231a including a circuit board 241 and/or a speaker module 245 and a second case 231b configured to accommodate the battery 243, and the outer case 233 may include a third case 233a coupled to face the first case 231a and a fourth case 233b coupled to face the second case 231b. For example, the first case 231a and the third case 233a (hereinafter, "first case parts 231a and 233a") may be coupled to accommodate the circuit board 241 and/or the speaker module 245, and the second case 231b and the fourth case 233b (hereinafter, "second case parts 231b and 233b") may be coupled to accommodate the battery 243.

According to various embodiments, the first case parts 231a and 233a may be hingedly coupled to the lens frame 202 via the hinge structures 229, and the second case parts 231b and 233b may be connected to or mounted on the ends of the first case parts 231a and 233a via the connection structures 235. In some embodiments, the portions of the connection structures 235 that come into contact with the user's body may be made of a material having low thermal conductivity (e.g., an elastic material such as silicone, polyurethane, or rubber), and the portions that do not come into contact with the user's body may be made of a material having a high thermal conductivity (e.g., a metal material). For example, when heat is generated from the circuit boards 241 or the batteries 243, the connection structures 235 block heat from being transferred to portions that come into contact with the user's body, and may disperse or release heat through the portions that are not come into contact with the user's body. According to an embodiment, the portions of the connection structures 235 that are configured to come into contact with the user's body may be interpreted as portions of the inner cases 231, and the portions of the connection structures 235 that do not come into contact with the user's body may be interpreted as portions of the outer cases 233. According to an embodiment, the first case part 231*a* and the second case part 231*b* may be integrally configured without the connection structure 235, and the third case part 233*a* and the fourth case part 233*b* may be integrally configured to each other without the connection structure 235. According to various embodiments, in addition to the illustrated components, other components (e.g., the antenna module 197 of FIG. 1) may be further included, and by using the communication module 190, information about an object or environment may be received from an external electronic device (e.g., the electronic device 102 or 104 or the server 108 in FIG. 1) using a communication module 190 via a network (e.g., the first network 198 or the second network 199 in FIG. 1).

Figure 6:
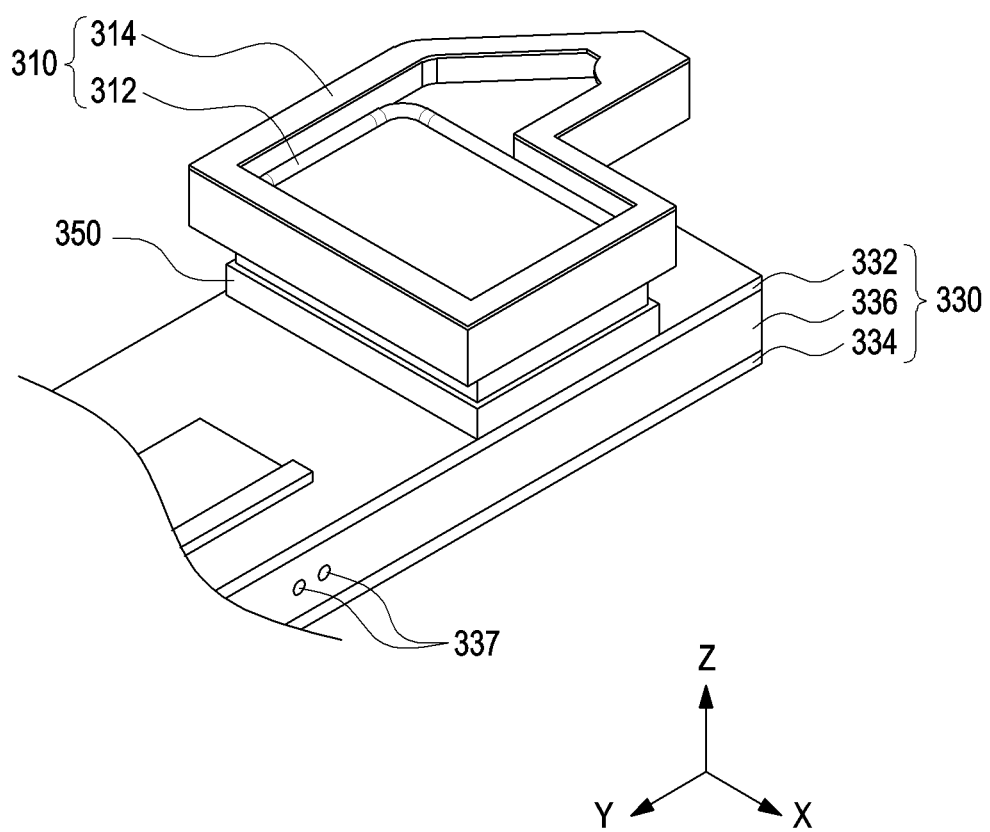
FIG. 6 is a perspective view of an electronic device for describing an interposer board and a speaker module according to an embodiment of the disclosure.
Figure 7:
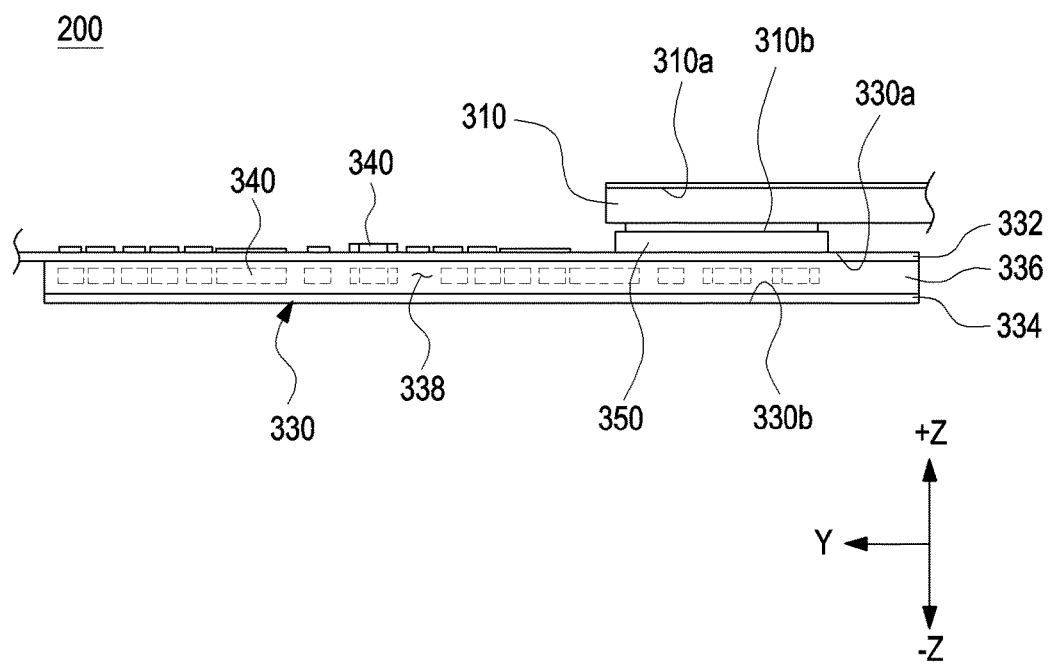
FIG. 7 is a side view of an electronic device for describing an interposer board and a speaker module according to an embodiment of the disclosure.
Figure 8:
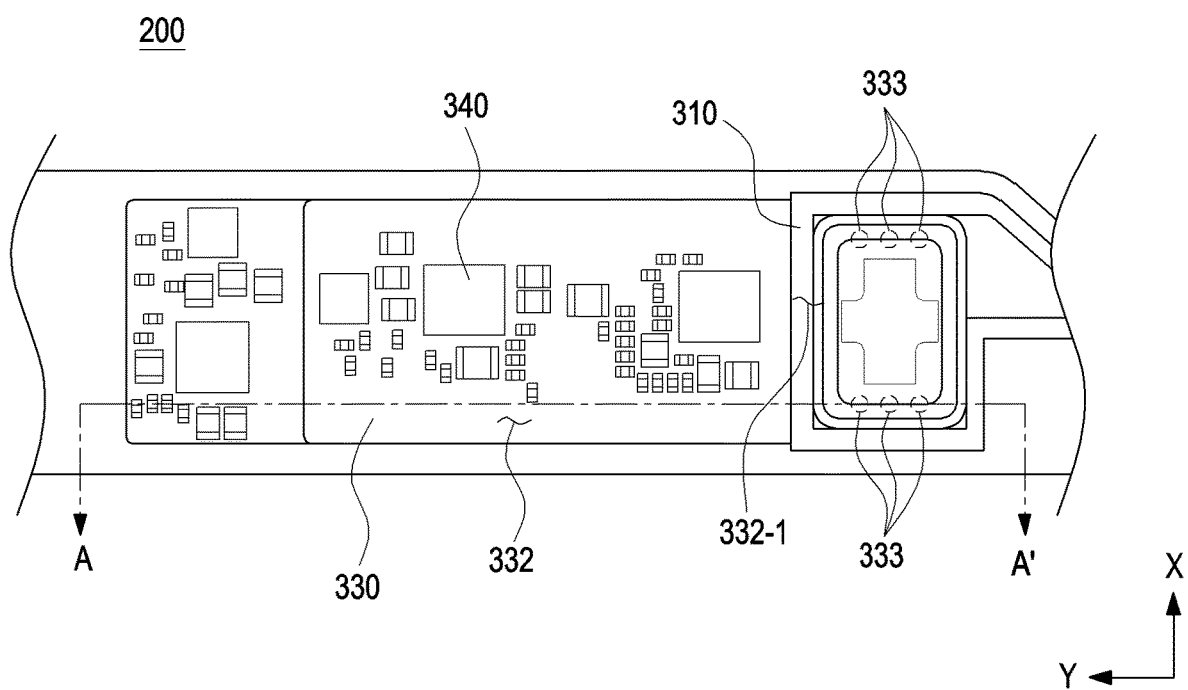
FIG. 8 is a front view illustrating an interposer board and a speaker module according to an embodiment of the disclosure.
Figure 9:
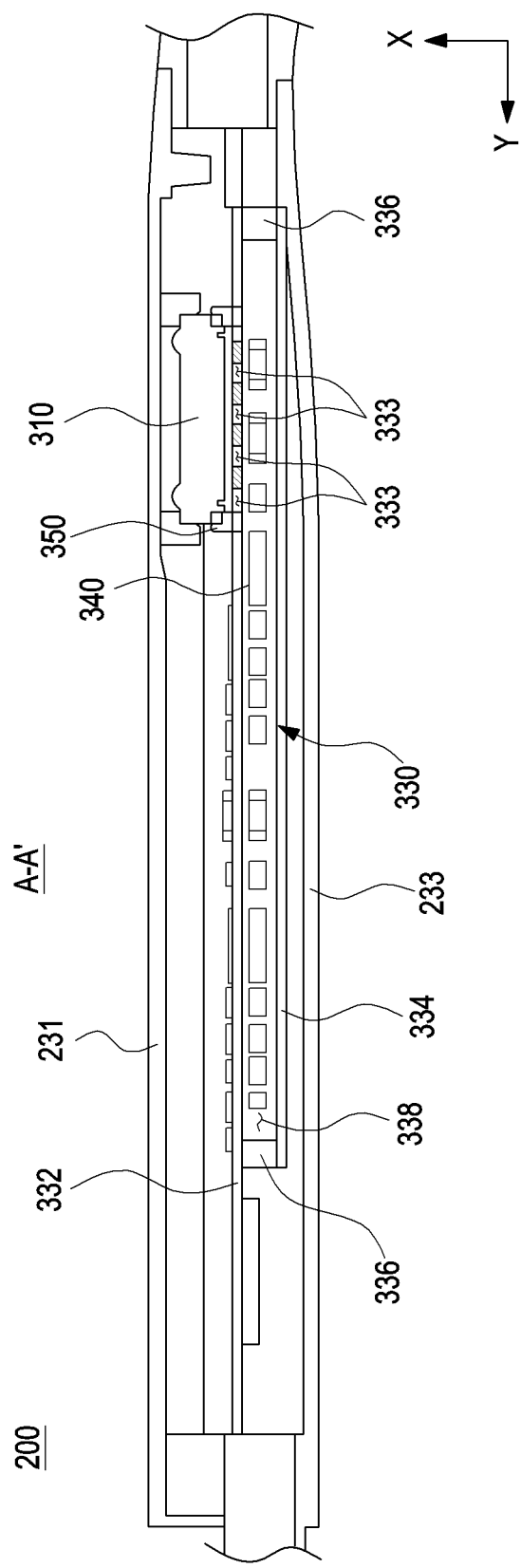
FIG. 9 is a cross-sectional view taken along line A-A' in FIG. 8.

FIG. 6 is a perspective view of an interposer board and a speaker module according to an embodiment of the disclosure. FIG. 7 is a side view illustrating an interposer board and a speaker module according to an embodiment of the disclosure. FIG. 8 is a front view illustrating an interposer board and a speaker module according to an embodiment of the disclosure. FIG. 9 is a cross-sectional view taken along line A-A' in FIG. 8.

Referring to FIGS. 6 to 9, the electronic device 200 may include a speaker module or speaker 310, an interposer board 330, and a sealing member 350. The configurations of the speaker module 310 and the interposer board 330 of FIG. 6 to 9 may be all or partly the same as those of the circuit board 241 and the speaker module 245 of FIGS. 3 to 5.

According to various embodiments, the interposer board 330 may include a plurality of boards. For example, the interposer board 330 may include a first board 332, a second board 334 spaced apart from the first board 332, and a side wall 336 that surrounds at least a part of the space between the first board 332 and the second board 334. According to an embodiment, the first board 332 and the second board 334 may be disposed substantially parallel to each other. According to an embodiment, the first board 332 or the second board 334 may be a board including at least one layer. According to an embodiment, each of the first board 332 and the second board 334 may be a board including at least one layer.

According to various embodiments, the interposer board 330 may include an internal space 338. According to an embodiment, the internal space 338 may be an empty space surrounded by the first board 332, the second board 334, and the side wall 336. For example, the internal space 338 may not be exposed to the outside of the interposer board 330 by being surrounded by the first board 332, the second board 334, and the side wall 336. According to an embodiment, at least some electronic components 340 may be disposed in the internal space 338. For example, at least some electronic components 340 may be located on the first board 332 in a direction in which the first board 332 faces the second board 334 (e.g., −Z direction) or may be located on the second board 332 in a direction in which the second board 332 faces the first board 332 (e.g., +Z direction). According to an embodiment, among the plurality of boards of the interposer board 330, a board adjacent to the inner case 231 may be interpreted as the first board 332, and a board adjacent to the outer case 233 may be interpreted as the second board 334.

According to various embodiments, the interposer board 330 may include at least one first through hole 333. According to an embodiment, a plurality of through holes 333 may be provided. According to an embodiment, the first through hole 333 may be an empty space interconnecting the outside and the inside (e.g., the internal space 338) of the interposer board 330. According to an embodiment, the first through hole 333 may form a path of sound generated by the speaker module 310. For example, at least a part of the sound generated by the speaker module 310 may be transmitted to the internal space 338 of the interposer board 330 through the first through hole 333. According to an embodiment, the first through hole 333 may be formed in the first board 332 and/or the second board 334. For example, the first through hole 333 may penetrate the first board 332 and/or the second board 334. A first area 332-1 of the first board 332 may include at least one first through hole 333. According to another embodiment, the first through hole 333 may be formed in the side wall 336. For example, the side wall 336 may include at least one first through hole 333, and at least a part of the vibration generated by the speaker module 310 may be transmitted to the internal space 338 of the interposer board 330 through the at least one first through hole 333 provided in the internal space 338.

According to various embodiments, the interposer board 330 may include at least one third through hole 337. According to an embodiment, the third through hole 337 may be an empty space interconnecting the outside and the inside (e.g., the internal space 338) of the interposer board 330. According to an embodiment, the third through hole 337 may be spaced apart from the first through hole 333. For example, the first through hole 333 may face at least a part of the speaker module 310, and the third through hole 337 may not overlap a component (e.g., the speaker module 310) of the electronic device 200. According to an embodiment, the third through hole 337 may be formed in any one of the first board 332, the second board 334, or the side wall 336. According to another embodiment, the third through hole 337 may be formed in each one of the first board 332, the second board 334, and the side wall 336.

According to an embodiment, the third through hole 337 may be interpreted as a heat dissipation hole. For example, heat generated by an electronic component 340 disposed in the internal space 338 of the interposer board 330 may be transferred to the outside of the interposer board 330 through the third through hole 337.

According to an embodiment, the third through hole 337 may be interpreted as a damping hole. For example, the internal space 338 of the interposer board 330 may be connected to the outside of the interposer board 330 through the third through hole 337 so that a pressure difference between the inside and the outside the interposer board 330 can be reduced.

According to various embodiments, the speaker module 310 may include a speaker unit 312 and a speaker frame 314 configured to accommodate the speaker unit 312.

According to an embodiment, the speaker unit 312 may convert an electrical signal into sound. For example, the speaker unit 312 may include at least one of a coil (e.g., a voice coil) configured to vibrate a diaphragm based on pulse width modulation (PWM), a diaphragm configured to vibrate, and/or a damping member (e.g., a spring) formed of a conductive material and configured to transmit a signal (e.g., electric power) transmitted from the outside of the speaker module 310 to the coil, a magnet, or a conductive plate configured to concentrate a magnetic field generated by the magnet.

According to an embodiment, the speaker frame 314 may define at least a part of the outer surface of the speaker module 310. For example, the speaker frame 314 is a component configured to accommodate the components of the speaker unit 312 (e.g., the coil, the diaphragm, and the damping member), and may include at least one of a protective cover configured to protect the diaphragm or a yoke configured to protect a component of the speaker unit 312 (e.g., the magnet). For example, the speaker frame 314 may mean a housing or a casing surrounding the speaker unit 312. According to an embodiment, at least a part of the speaker frame 314 may be used as a resonator configured to accumulate at least a part of the sound generated by the speaker unit 312. For example, the speaker frame 314 may include a speaker resonance space, and the speaker resonance space may be used, in combination with the internal space 338 of the interposer board 330, as a place in which the vibration generated by the speaker 310 is resonated. According to an embodiment, the speaker frame 314 may face at least a part of the first board 332. For example, the speaker frame 314 may be disposed above the first board 332 (e.g., in the +Z direction).

According to various embodiments, at least a part of the vibration (e.g., sound) generated by the speaker module 310 may be transmitted to the inside of a component of the electronic device 200 including an empty space. According to an embodiment, at least a part of the vibration (e.g., sound) generated by the speaker module 310 may be transmitted to the internal space 338 of the interposer board 330. For example, the front surface 310a of the speaker module 310 on which the diaphragm of the speaker module 310 is located may be disposed to face the outside of the electronic device 200, and the rear surface 310b of the speaker module 310 may be disposed to face the front surface 330a of the interposer board 330. The rear surface 310b of the speaker module 310 may face the through hole 333 in the first board 332. The interposer board 330 may also have a back surface 330b facing in a direction different from the front surface 330a. According to another embodiment, at least a part of the vibration (e.g., sound) generated by the speaker module 310 may be transmitted to a shield can configured to block electromagnetic waves. For example, the speaker module 310 may face the shield can including a through hole and an empty space, and the vibration generated by the speaker module 310 may be transmitted to the empty space through the through hole.

According to various embodiments, the speaker module 310 may be disposed on the interposer board 330. According to an embodiment, the speaker module 310 may be disposed on the first board 332 in which the first through hole 333 is provided, and at least a part of the speaker module 310 may face the at least one first through hole 333. For example, the speaker module 310 may include a first surface 310a facing the outside of the electronic device 200 and a second surface 310b opposite to the first surface 310a, and the second surface 310b may face the third surface 330a of the interposer board 330. The third surface 330a may be oriented in substantially the same direction as the first surface 310a. According to an embodiment, the speaker module 310 may be disposed between the first board 332 and the inner case 231.

According to various embodiments, the sealing member 350 may reduce the leakage of the sound generated by the speaker module 310. For example, the sealing member 350 may be connected to the speaker module 310 and the interposer board 330. According to an embodiment, the sealing member 350 may be disposed to correspond to the speaker module 310 and the first through hole 333 in the interposer board 330. For example, the sealing member 350 may be disposed between the speaker module 310 and the first board 332 to surround the first through hole 333. According to an embodiment, the sealing member 350 may be disposed between the first area 332-1 of the first board 332 in which the first through hole 333 is located and the speaker module 310. For example, when the interposer board 330 is viewed from above (e.g., in the +Z direction), at least a part of the sealing member 350 may overlap the first area 332-1 of the first board 332.

According to an embodiment, the sealing member 350 may be formed of a flexible material. For example, the sealing member 350 may include polyurethane foam.

According to various embodiments, the electronic device 200 may include at least one electronic component 340 (e.g., the processor 120 in FIG. 1). At least some of the one or more electronic components 340 may be mounted on the interposer board 330. For example, the electronic components 340 may be mounted on the first board 332 and/or the second board 334. At least some electronic components 340 may be disposed in the internal space 338 of the interposer board 330.

Figure 10:
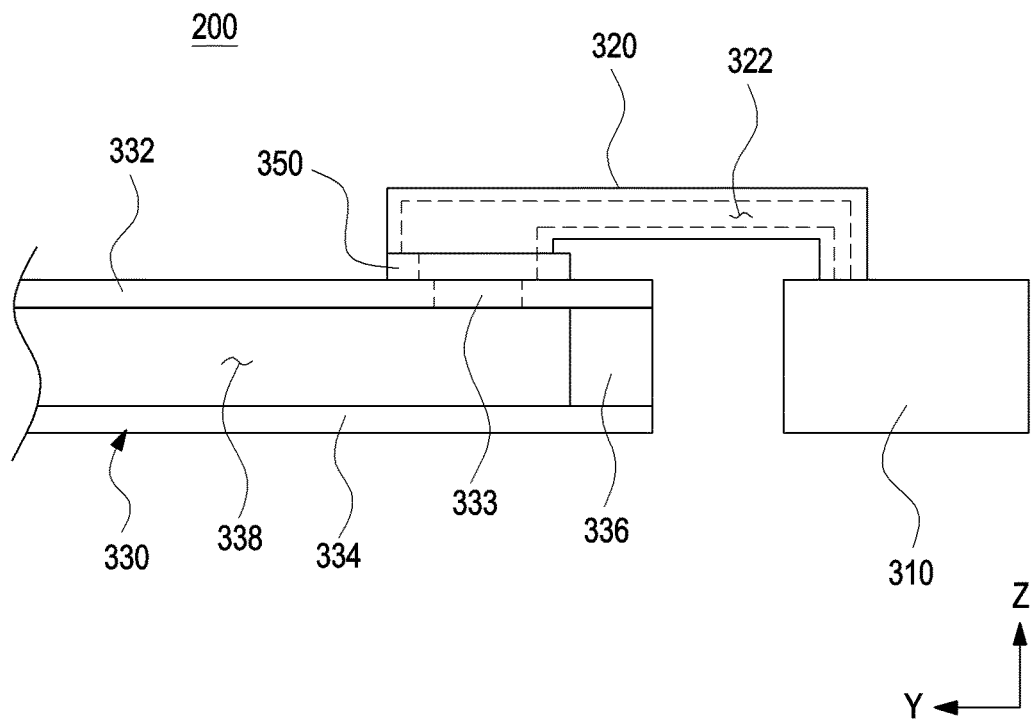
FIG. 10 is a side view illustrating an interposer board and a speaker module according to another embodiment of the disclosure.
Figure 11:
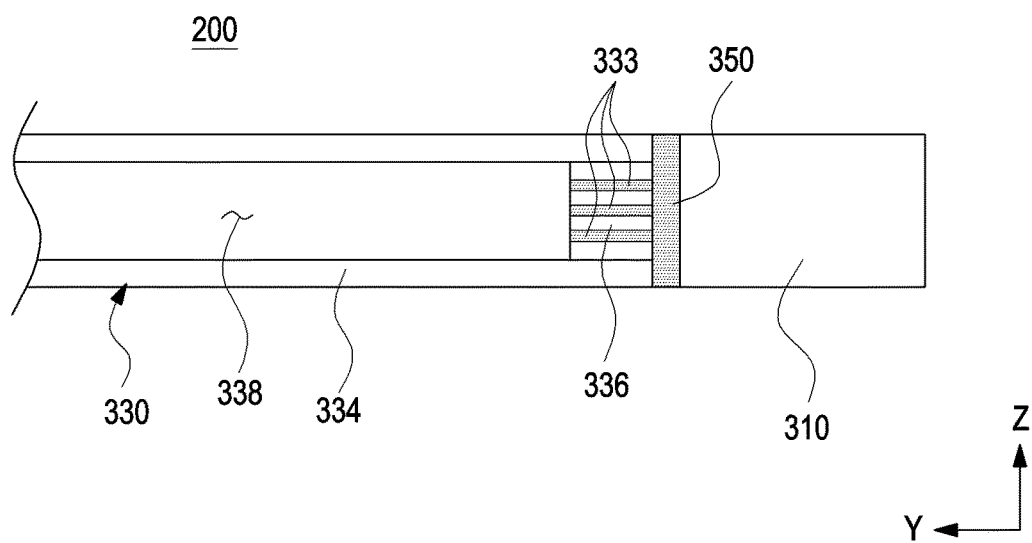
FIG. 11 is a side view illustrating an interposer board and a speaker module according to still another embodiment of the disclosure.

FIG. 10 is a side view illustrating an interposer board and a speaker module according to another embodiment of the disclosure. FIG. 11 is a side view illustrating an interposer board and a speaker module according to still another embodiment of the disclosure.

Referring to FIGS. 10 and 11, the electronic device 200 may include a speaker module 310, an interposer board 330, and a sealing member 350. The configurations of the speaker module 310, the interposer board 330, and the sealing member 350 of FIG. 10 may be same as those of the speaker module 310, the interposer board 330, and the sealing member 350 of FIGS. 6 to 9. According to another embodiment, the configurations of the speaker module 310, the interposer board 330, and the sealing member 350 of FIG. 10 may be partly same as those of the speaker module 310, the interposer board 330, and the sealing member 350 of FIGS. 6 to 9.

According to various embodiments, the speaker module 310 may be located next to the interposer board 330. According to an embodiment, at least a part of the speaker module 310 may face at least a part of the side wall 336 of the interposer board 330.

Referring to FIG. 10, according to various embodiments, the speaker module 310 may include a connection member 320 configured to transmit sound generated by the speaker module 310 to the internal space 338 of the interposer board 330. According to an embodiment, the speaker module 310 may transmit vibration (e.g., sound) to the internal space 338 of the interposer board 330 via the connection member 320. For example, at least a part of the connection member 320 may face the at least one first through hole 333, and the vibration generated by the speaker module 310 may be transmitted to the first through hole 333 and the internal space 338 through the connection member 320. The configuration of the connection member 320 of FIG. 10 may be all or partly the same as that of the connection member 248 of FIG. 5.

According to various embodiments, the connection member 320 may include at least one second through hole 322 configured to provide a path for the sound generated by the speaker module 310. According to an embodiment, the second through hole 322 may be a conduit for the sound generated by the speaker module 310. The second through hole 322 may face the first through hole 333. For example, the vibration or sound transmitted from the second through hole 322 may be transmitted to the internal space 338 through the first through hole 333. According to an embodiment, the connection member 320 may be connected to the sealing member 350 surrounding the first through hole 333. For example, the connection member 320 may extend from the speaker frame (e.g., the speaker frame 314 in FIG. 6) of the speaker module 310 and may face the first board 332 in which the first through hole 333 is provided.

According to various embodiments, the connection member 320 may be formed through injection molding. For example, the connection member 320 may be manufactured through injection molding using a synthetic resin.

According to an embodiment, the connection member 320 may be a separate component connected to the speaker frame (e.g., the speaker frame 314 in FIG. 6) of the speaker module 310. According to an embodiment, the connection member 320 may be integrated with the speaker frame (e.g., the speaker frame 314 in FIG. 6) of the speaker module 310.

Referring to FIG. 11, according to various embodiments, the speaker module 310 may face the interposer board 330. According to various embodiments, the speaker module 310 may directly face the interposer board 330. According to an embodiment, the at least one first through hole 333 may be formed in the side wall 336 of the interposer board 330. The speaker module 310 may face the side wall 336 in which the at least one first through hole 333 is provided, and the vibration generated by the speaker module 310 may be transmitted to the internal space 338 through the first through hole 333.

Figure 12:
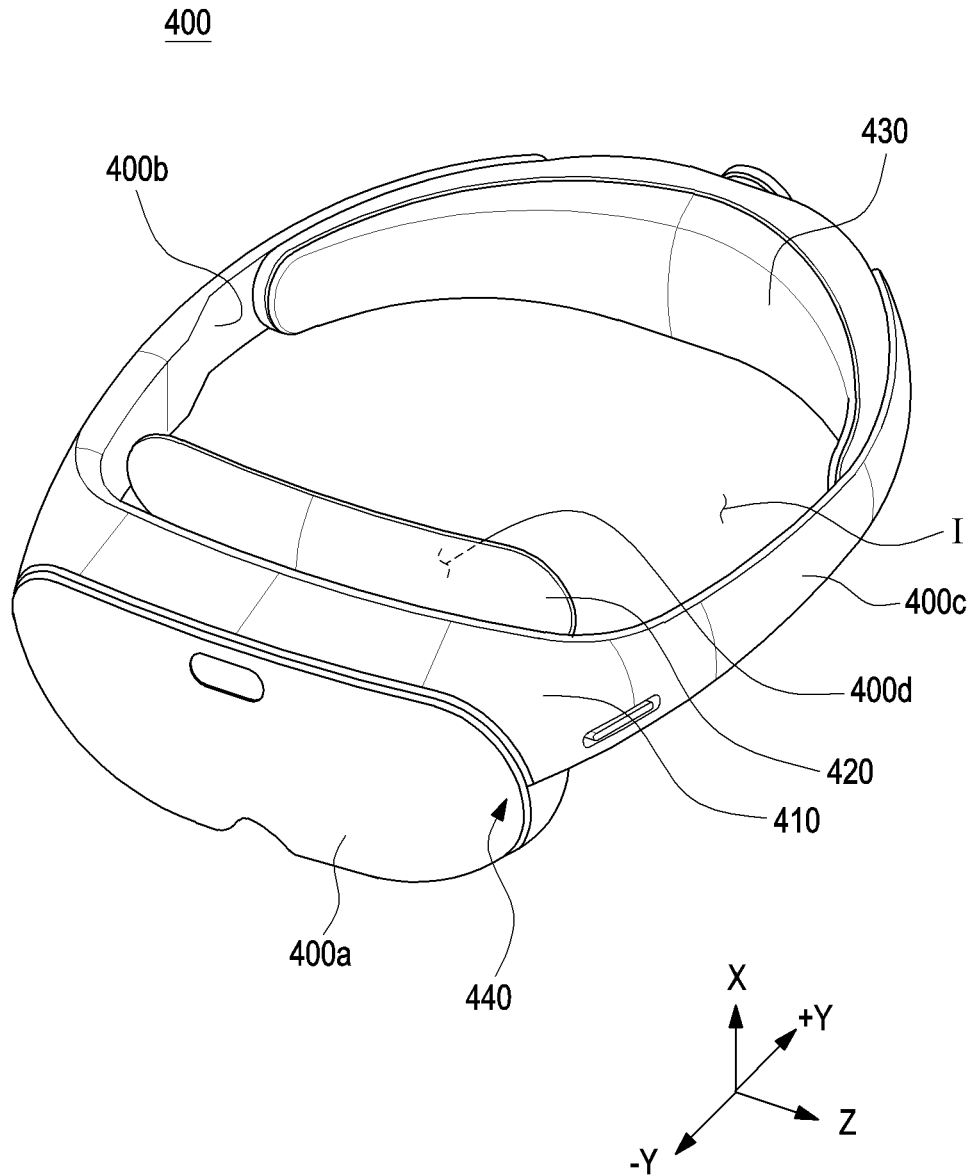
FIG. 12 is another perspective view illustrating a wearable electronic device according to various embodiments of the disclosure.

FIG. 12 is another perspective view of an electronic device according to various embodiments of the disclosure.

Referring to FIG. 12, the electronic device 400 may be a head mount device (HMD) capable of providing an image in front of the user's eyes. The configuration of the electronic device 400 of FIG. 12 may be same as that of the electronic device 200 of FIG. 2. According to another embodiment, the configuration of the electronic device 400 of FIG. 12 may be partly same as that of the electronic device 200 of FIG. 2.

According to various embodiments, the electronic device 400 may include housings 410, 420, and 430 capable of defining the exterior of the electronic device 400 and capable of providing spaces in which the components of the electronic device 400 can be disposed.

According to various embodiments, the electronic device 400 may include a first housing 410 that can surround at least a part of a user's head. According to an embodiment, the first housing 410 may include a first surface 400*a* facing the outside of the electronic device 400 (e.g., in the −Y direction).

According to various embodiments, the first housing 410 may surround at least a part of the internal space I. For example, the first housing 410 may include a second surface 400*b* facing the internal space I of the electronic device 400 and a third surface 400*c* opposite to the second surface 400*b*. According to an embodiment, the first housing 410 may be coupled to the third housing 430 to have a closed loop shape surrounding the internal space I.

According to various embodiments, the first housing 410 may accommodate at least some of the components of the electronic device 400. For example, the light output module (e.g., the light output module 211 in FIG. 3) and a circuit board (e.g., the circuit board 241 and the speaker module 245 in FIG. 3) may be disposed inside the first housing 410.

According to various embodiments, the electronic device 400 may include one display member 440 corresponding to left and right eyes. The display member 440 may be disposed on the first housing 410. The configuration of the display member 440 of FIG. 12 may be all or partly the same as that of the display member 201 of FIG. 2.

According to various embodiments, the electronic device 400 may include a second housing 420 that can be seated on the user's face. According to an embodiment, the second housing 420 may include a fourth surface 400*d* that may at least partially face the user's face. According to an embodiment, the fourth surface 400*d* may be a surface facing the internal space I of the electronic device 400 (e.g., in the +Y direction). According to an embodiment, the second housing 420 may be coupled to the first housing 410.

According to various embodiments, the electronic device 400 may include a third housing 430 that can be seated on the rear portion of the user's head. According to an embodiment, the third housing 430 may be coupled to the first housing 410. According to an embodiment, the third housing 430 may accommodate at least some of the components of the electronic device 400. For example, a battery (e.g., the battery 243 in FIG. 3) may be disposed in the third housing 430.

According to various embodiments of the disclosure, an electronic device (e.g., the electronic device 200 in FIG. 2) may include: a housing (e.g., the housing 210 in FIG. 2); a speaker module (e.g., the speaker module 245 in FIG. 3) disposed in the housing; an interposer board (e.g., the interposer board 330 in FIG. 6) located inside the housing and including a first board (e.g., the first board 332 in FIG. 6), a second board (e.g., the second board 334 in FIG. 6) spaced apart from the first board, and a side wall (e.g., the side wall 336 in FIG. 6) surrounding an internal space (e.g., the internal space 338 in FIG. 8) located between the first board and the second board; and a sealing member (e.g., the sealing member 350 in FIG. 6) connected to the speaker module and the first board. The first board may include at least one first through hole (e.g., the first through hole 333 in FIG. 8) configured to transmit at least a part of vibration generated by the speaker module to the internal space.

According to various embodiments, at least a part of the speaker module may face the at least one first through hole.

According to various embodiments, the sealing member may be disposed between the speaker module and a first area (e.g., the first area 332-1 in FIG. 8) of the first board including the at least one first through hole.

According to various embodiments, the speaker module may include a speaker unit (e.g., the speaker unit 312 in FIG. 6) and a speaker frame configured to accommodating the speaker unit and facing the first board (e.g., the speaker frame 314 in FIG. 6).

According to various embodiments, at least a part of the speaker module may face at least a part of the side wall.

According to various embodiments, the speaker module may include a connection member (e.g., the connection member 320 in FIG. 10), at least a part of which faces the at least one first through hole.

According to various embodiments, the connection member may include at least one second through hole (e.g., the second through hole 322 in FIG. 10) configured to transmit at least a part of sound generated by the speaker module to the at least one first through hole and the internal space.

According to various embodiments, the interposer board may include at least one third through hole (e.g., the third through hole 337 in FIG. 6) spaced apart from the at least one first through hole.

According to various embodiments, the housing may include a lens frame (e.g., the lens frame 202 in FIG. 2) configured to accommodate a display member (e.g., the display member 201 in FIG. 2) and a wearing member (e.g., the wearing member 203 in FIG. 2) extending from the lens frame and configured to accommodate the speaker module and the interposer board.

According to various embodiments, the wearing member may include an inner case (e.g., inner case 231 in FIG. 5) including an inner surface (e.g., the inner surface 231c in FIG. 2) configured to face the user's body and an outer case (e.g., the outer case 233 in FIG. 5) including an outer surface (e.g., the outer surface 231d in FIG. 2) opposite to the inner surface, and the speaker module may be disposed between the inner case and the interposer board.

According to various embodiments, the electronic device may further include a battery (e.g., the battery 243 in FIG. 5) disposed inside the wearing member and configured to provide power to the speaker module, wherein the speaker module may be disposed between the battery and the interposer board.

According to various embodiments, the electronic device may further include a light output module (e.g., the light output module 211 in FIG. 3) disposed in the housing and configured to output an image.

According to various embodiments, the sealing member may have a closed loop shape.

According to various embodiments, the speaker module may include a speaker unit (e.g., the speaker unit 312 in FIG. 6) and a speaker frame (e.g., the speaker frame 314 in FIG. 6) configured to accommodate the speaker unit and including a speaker resonance space configured to receive vibration generated by the speaker unit, and the sound generated by the speaker unit may be configured to resonate in the speaker resonance space and the internal space.

According to various embodiments, the housing may include: a first housing (e.g., the first housing 410 in FIG. 12) disposed to surround at least a part of a user's head; a second housing (e.g., the second housing 420 of FIG. 12) coupled to the first housing and configured to be seated on a user's face; and a third housing (e.g., the third housing 430 of FIG. 12) coupled to the first housing and configured to be seated on the rear portion the user's head.

According to various embodiments of the disclosure, the electronic device (e.g., the electronic device 200 in FIG. 2) may include: a lens frame (e.g., the lens frame 202 in FIG. 2) configured to accommodate the display member (e.g., the display member 201 in FIG. 2); a wearing member (e.g., the wearing member 203 in FIG. 2) extending from the lens frame; a speaker module (e.g., the speaker module 245 in FIG. 3) disposed in the wearing member; a light output module (e.g., the light output module 211 of FIG. 3) configured to output an image to the display member; an interposer board (e.g., the interposer board 330 in FIG. 6) including a first board (e.g., the first board 332 in FIG. 6), a second board (e.g., the second board 334 in FIG. 6) spaced apart from the first board, and a side wall (e.g., the side wall 336 of FIG. 6) surrounding at least a part of an internal space (e.g., the internal space 338 in FIG. 7) located between the first board and the second board; and a sealing member (e.g., the sealing member 350 in FIG. 6) connected to the speaker module and the first board. The first board may include at least one first through hole (e.g., the first through hole 333 in FIG. 8) configured to transmit at least a part of vibration generated by the speaker module to the internal space.

According to various embodiments, at least a part of the speaker module faces the at least one first through hole, and the sealing member may be disposed between the speaker module and a first area (e.g., the first area 332-1 in FIG. 8) of the first board including the at least one first through hole.

According to various embodiments, at least a part of the speaker module may face at least a part of the side wall, the speaker module may include a connection member (e.g., the connection member 320 in FIG. 10), at least a part of which faces the at least one first through hole, and the connection member may include a second through hole (e.g., the second through hole 322 in FIG. 10) configured to transmit at least a part of sound generated by the speaker module to the at least one first through hole and the internal space.

According to various embodiments, the wearing member may include an inner case (e.g., inner case 231 in FIG. 5) including an inner surface (e.g., the inner surface 231c in FIG. 2) configured to face the user's body and an outer case (e.g., the outer case 233 in FIG. 5) including an outer surface (e.g., the outer surface 231d in FIG. 2) opposite to the inner surface, and the speaker module may be disposed between the inner case and the interposer board.

According to various embodiments, the electronic device may further include a battery (e.g., the battery 243 in FIG. 5) disposed inside the wearing member and configured to provide power to the speaker module, wherein the speaker module may be disposed between the battery and the interposer board.

It may be apparent to a person of ordinary skill in the technical field to which the disclosure belongs that the above-described electronic device including various speaker modules according to the disclosure is not limited by the above-described embodiments and drawings, and can be variously substituted, modified, and changed within the technical scope of the disclosure.

What is claimed is:
1. An electronic device comprising:
a housing;
a speaker provided inside the housing, and comprising a first resonance space;
an interposer board provided inside the housing, the interposer board including a first board, a second board spaced apart from the first board, and a side wall surrounding an internal space between the first board and the second board, wherein the internal space is a second resonance space; and
a sealing member provided between the speaker and the first board,
wherein the first board includes at least one first through hole configured to transmit at least a portion of sound generated by the speaker to the internal space, and
wherein at least the portion of sound generated by the speaker resonates in the first resonance space in the speaker and the second resonance space in the interposer board.

2. The electronic device of claim 1, wherein at least a portion of the speaker faces the at least one first through hole.

3. The electronic device of claim 2, wherein the sealing member is provided between the speaker and a first area of the first board including the at least one first through hole.

4. The electronic device of claim 2, wherein the speaker includes a speaker unit and a speaker frame configured to accommodate the speaker unit and facing the first board.

5. The electronic device of claim 1, wherein at least a portion of the speaker faces at least a portion of the side wall.

6. The electronic device of claim 5, wherein the speaker includes a connection member connecting the speaker to the interposer board, and
wherein at least a portion of the connection member faces the at least one first through hole.

7. The electronic device of claim 6, wherein the connection member includes at least one second through hole configured to transmit at least the part of the sound generated by the speaker to the at least one first through hole and the internal space.

8. The electronic device of claim 1, wherein the interposer board includes at least one third through hole spaced apart from the at least one first through hole.

9. The electronic device of claim 1, wherein the housing includes a lens frame configured to accommodate a display member, and a wearing member extending from the lens frame and configured to accommodate the speaker and the interposer board.

10. The electronic device of claim 9, wherein the wearing member includes an inner case having an inner surface configured to face a body of user of the electronic device and an outer case including an outer surface opposite to the inner surface, and
the speaker is provided between the inner case and the interposer board.

11. The electronic device of claim 9, further comprising:
a battery provided in the wearing member and configured to provide power to the speaker,
wherein the speaker is provided between the battery and the interposer board.

12. The electronic device of claim 1, further comprising:
a light output device provided inside the housing and configured to output an image.

13. The electronic device of claim 1, wherein the sealing member has a closed loop shape.

14. The electronic device of claim 1, wherein the speaker includes a speaker unit and a speaker frame including a speaker resonance space configured to accommodate the speaker unit and receive sound generated by the speaker unit, and
the sound generated by the speaker unit resonates in the speaker resonance space and the internal space.

15. The electronic device of claim 1, wherein the housing includes:
a first housing configured to surround at least a portion of a head of a user;
a second housing coupled to the first housing and configured to be seated on a face of the user; and
a third housing coupled to the first housing and configured to be seated on a rear portion of the head of the user.

* * * * *